United States Patent
Halawani et al.

(10) Patent No.: US 12,224,887 B1
(45) Date of Patent: Feb. 11, 2025

(54) METHOD AND APPARATUS FOR TRANSMITTING DATA

(71) Applicant: Allegro MicroSystems, LLC, Manchester, NH (US)

(72) Inventors: Ahmad Nour Halawani, Heidelberg (DE); Emil Pavlov, Heidelberg (DE)

(73) Assignee: Allegro MicroSystems, LLC, Manchester, NH (US)

( * ) Notice: Subject to any disclaimer, the term of this patent is extended or adjusted under 35 U.S.C. 154(b) by 0 days.

(21) Appl. No.: 18/498,109

(22) Filed: Oct. 31, 2023

(51) Int. Cl.
| | |
|---|---|
| *H03K 9/08* | (2006.01) |
| *H04L 7/04* | (2006.01) |
| *H04L 25/49* | (2006.01) |

(52) U.S. Cl.
CPC .......... *H04L 25/4902* (2013.01); *H04L 7/041* (2013.01)

(58) Field of Classification Search
CPC .... H04B 7/0697; H04B 7/0417; H04B 14/04; G06F 15/16; G06F 11/0709; G06F 11/0769; H04W 72/042; H04W 72/044; H04L 25/4902; H04L 1/0006; H04L 1/0061
USPC ........................................................ 375/238
See application file for complete search history.

(56) References Cited

U.S. PATENT DOCUMENTS

| | | |
|---|---|---|
| 8,183,982 B2 | 5/2012 | Scherr |
| 8,519,819 B2 | 8/2013 | Scherr |
| 8,577,634 B2 | 11/2013 | Donovan et al. |
| 8,922,331 B2 | 12/2014 | Scherr |
| 8,948,280 B2 | 2/2015 | Hammerschmidt et al. |
| 9,172,565 B2 | 10/2015 | Cadugan et al. |
| 9,210,015 B2 | 12/2015 | Scherr et al. |
| 9,444,613 B2 | 9/2016 | Hammerschmidt et al. |
| 9,455,849 B2 | 9/2016 | Scherr et al. |
| 9,634,715 B2 | 4/2017 | Scheinkerman et al. |
| 9,667,409 B2 | 5/2017 | Scherr |
| 9,739,846 B2 | 8/2017 | Petrie et al. |
| 9,787,495 B2 | 10/2017 | Vreeland et al. |
| 10,326,621 B1 | 6/2019 | Geisler et al. |
| 10,700,848 B2 | 6/2020 | Scherr |

(Continued)

FOREIGN PATENT DOCUMENTS

| | | |
|---|---|---|
| DE | 102019009169 W | 12/2020 |
| EP | 0158645 | 2/1988 |

OTHER PUBLICATIONS

U.S. Appl. No. 17/936,469, filed Sep. 29, 2022, Casu, et al.
U.S. Appl. No. 18/426,449, filed Jan. 30, 2024, Veilleux.

*Primary Examiner* — Khai Tran
(74) *Attorney, Agent, or Firm* — Daly, Crowley, Mofford & Durkee, LLP (57) ABSTRACT

A method comprising: transmitting a data block that is part of a message, the data block including a plurality of data block symbols; detecting a duration of an end portion of the message, the duration being detected based on a difference between: (i) a time that is allotted for transmitting the message and (ii) a time needed for transmitting the data block as well as any other element of the message that precedes the end portion; and transmitting one or more auxiliary data symbols as part of the end portion of the message, wherein the end portion has a flexible duration that is selected to synchronize a total duration of the message to the time that is allotted for transmitting the message, and wherein each of the data block symbols and each of the auxiliary data symbols is encoded by using pulse-width modulation (PWM).

24 Claims, 6 Drawing Sheets

(56) References Cited

U.S. PATENT DOCUMENTS

| | | | |
|---|---|---|---|
| 10,747,708 B2 | 8/2020 | Kozomora et al. | |
| 11,032,100 B2 | 6/2021 | Scherr | |
| 11,368,533 B2 | 6/2022 | Kozomora et al. | |
| 11,811,569 B2 | 11/2023 | Ferrer et al. | |
| 2014/0258566 A1* | 9/2014 | Bowling | G06F 11/3089 710/18 |
| 2016/0277149 A1* | 9/2016 | Hammerschmidt | H04L 25/4902 |
| 2020/0244481 A1 | 7/2020 | Scherr | |
| 2022/0239462 A1 | 7/2022 | Kozomora et al. | |
| 2023/0391347 A1* | 12/2023 | Hwang | G01R 31/52 |

\* cited by examiner

METHOD AND APPARATUS FOR TRANSMITTING DATA

BACKGROUND

Sensor data transmission applications have distinct requirements to ensure efficient and reliable communication of data from sensors to receiving systems. In such applications, high data accuracy is essential as sensor data often forms the basis for critical decisions. Bandwidth efficiency is another key requirement, particularly in scenarios with limited network resources. Finally, scalability and compatibility with various sensor types and communication protocols are necessary to accommodate the diverse range of sensors used in different applications. Meeting these needs ensures that sensor data transmission applications can provide accurate, timely, and reliable information for decision-making and control processes.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

According to aspects of the disclosure, a method is provided comprising: transmitting a data block that is part of a message, the data block including a plurality of data block symbols; detecting a duration of an end portion of the message, the duration being detected based on a difference between: (i) a time that is allotted for transmitting the message and (ii) a time needed for transmitting the data block as well as any other element of the message that precedes the end portion; and transmitting one or more auxiliary data symbols as part of the end portion of the message, wherein the end portion has a flexible duration that is selected to synchronize a total duration of the message to the time that is allotted for transmitting the message, and wherein each of the data block symbols and each of the auxiliary data symbols is encoded by using pulse-width modulation (PWM).

According to aspects of the disclosure, a system is provided comprising: a memory; and a processing circuitry that is operatively coupled to the memory, the processing circuitry being configured to: transmit a data block that is part of a message, the data block including a plurality of data block symbols; detect a duration of an end portion of the message, the duration being detected based on a difference between: (i) a time that is allotted for transmitting the message and (ii) a time needed for transmitting the data block as well as any other element of the message that precedes the end portion; and transmit one or more auxiliary data symbols as part of the end portion of the message, wherein the end portion has a flexible duration that is selected to synchronize a total duration of the message to the time that is allotted for transmitting the message, and wherein each of the data block symbols and each of the auxiliary data symbols is encoded by using pulse-width modulation (PWM).

According to aspects of the disclosure, a non-transitory computer-readable medium is provided that stores one or more processor executable instructions, which, when executed by a processing circuitry of a sensor cause the processing circuitry to perform the operations of: transmitting a data block that is part of a message, the data block including a plurality of data block symbols; detecting a duration of an end portion of the message, the duration being detected based on a difference between: (i) a time that is allotted for transmitting the message and (ii) a time needed for transmitting the data block as well as any other element of the message that precedes the end portion; and transmitting one or more auxiliary data symbols as part of the end portion of the message, wherein the end portion has a flexible duration that is selected to synchronize a total duration of the message to the time that is allotted for transmitting the message, and wherein each of the data block symbols and each of the auxiliary data symbols is encoded by using pulse-width modulation (PWM).

According to aspects of the disclosure, a system is provided comprising: means for transmitting a data block that is part of a message, the data block including a plurality of data block symbols; means for detecting a duration of an end portion of the message, the duration being detected based on a difference between: (i) a time that is allotted for transmitting the message and (ii) a time needed for transmitting the data block as well as any other element of the message that precedes the end portion; and means for transmitting one or more auxiliary data symbols as part of the end portion of the message, wherein the end portion has a flexible duration that is selected to synchronize a total duration of the message to the time that is allotted for transmitting the message, and wherein each of the data block symbols and each of the auxiliary data symbols is encoded by using pulse-width modulation (PWM).

BRIEF DESCRIPTION OF THE DRAWING FIGURES

Other aspects, features, and advantages of the claimed invention will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features.

DETAILED DESCRIPTION

Figure 1:
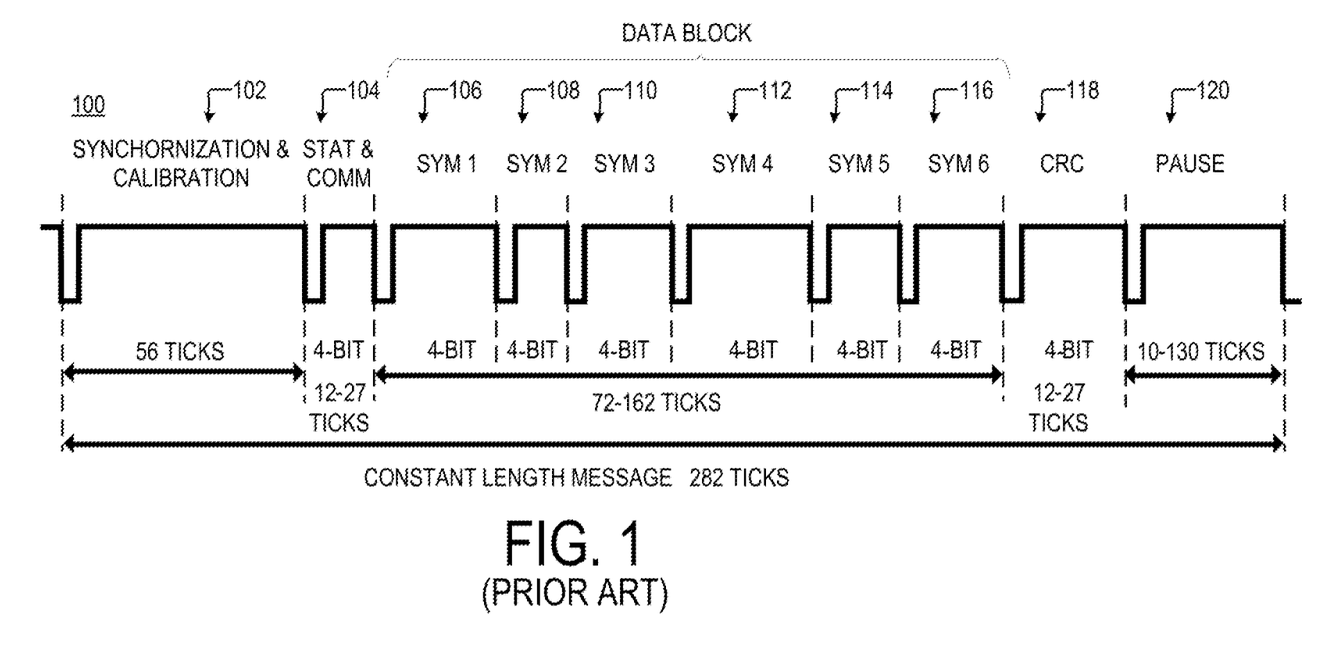
FIG. 1 is a waveform diagram of a message, according to the prior art.

FIG. 1 is a waveform diagram of a message 100, according to the prior art. As illustrated, message 100 may include a synchronization and calibration pulse 102, a status and communications nibble 104, data nibbles 106-116, a Cyclic Redundancy Check (CRC) nibble 118, and a pause pulse 120.

Synchronization and calibration pulse 102 flags the start of message 100 and it serves as a benchmark for analysis of the signal that encodes message 100. Synchronization and calibration pulse 102 is equal to 56 ticks, where a tick is a unit of time used to measure the duration of various pulses that are part of message 100. A tick could have any suitable duration, such as 3 microseconds, 3.54 microseconds, or 4 microseconds, for example. In this regard, the synchronization and calibration pulse 102 may be used to determine the exact length (in seconds) of a tick, which is used afterwards in decoding the signal that represents message 100. According to the present example, message 100 has a fixed duration of 1000 microseconds (or 282 ticks), and each tick is equal to 3.54 microseconds.

Status and communications nibble 104 may encode diagnostic information along with additional data. For example, status and communications nibble 104 may be used to communicate device ID information, and or any other type of information.

Nibbles 106-116 form what is herein referred to as the "data block" of message 100. Each of the nibbles 106-116 may encode up to 4 bits of data. Specifically, each of the nibbles 106-116 may encode a different respective symbol having a value in the range 0x0-0xF. According to the example, nibble 106 may encode a first symbol (hereinafter "symbol 1"), nibble 108 may encode a second symbol (hereinafter "symbol 2"), nibble 110 may encode a third symbol (hereinafter "symbol 3"), nibble 112 may encode a fourth symbol (hereinafter "symbol 4"), nibble 114 may encode a fifth symbol (hereinafter "symbol 5"), and nibble 116 may encode a sixth symbol (hereinafter "symbol 6").

According to the present example, each of the symbols is encoded by using pulse-width modulation (PWM), such that the value of the symbol is represented by the duration of the pulse (or nibble) that encodes it. For example, a pulse (or nibble) that is 12 ticks wide may encode the value of '0x0', a pulse (or nibble) that is 13 ticks wide may encode the value of '0x1', a pulse (or nibble) that is 14 ticks wide may encode the value of '0x2', a pulse (or nibble) that is 15 ticks wide may encode the value of '0x3', and so on, up to a pulse (or nibble) that is 27 ticks wide for the value of '0xF'. As a result of this arrangement, the duration of each pulse (or nibble) would be proportional to the value that is encoded by that pulse (or nibble). For example, a nibble that encodes the value of 0x1 would have a shorter duration than another nibble that encodes the value of 0xC. As used throughout the disclosure, the phrases "nibble" and "pulse" are used interchangeably. Furthermore, as used throughout the disclosure, the phrases "width of a pulse (or nibble)" and "duration of a pulse (or nibble)" are also used interchangeably.

CRC nibble 118 contains a checksum for the data block of message 100. CRC nibble 118 and status and communications nibble 104 may also use PWM to encode data.

Pause pulse 120 may synchronize the transmission of message 100 to a fixed period of time. The duration of pause pulse 120 may be selected so that the total transmission time of the message adds up to exactly 1000 microseconds. Thus, the shorter the total duration of nibbles 104-118, the longer the duration of pause pulse 120. By contrast, the longer the total duration of nibbles 104-118, the shorter the duration of the pause pulse 120. In the example of FIG. 1, pause pulse 120 may have a duration in the range of 10-130 ticks, synchronization and calibration pulse 102 may have a duration equal to 56 ticks, and each of nibbles 104-118 may have a duration in the range of 12-27 ticks.

Figure 2:
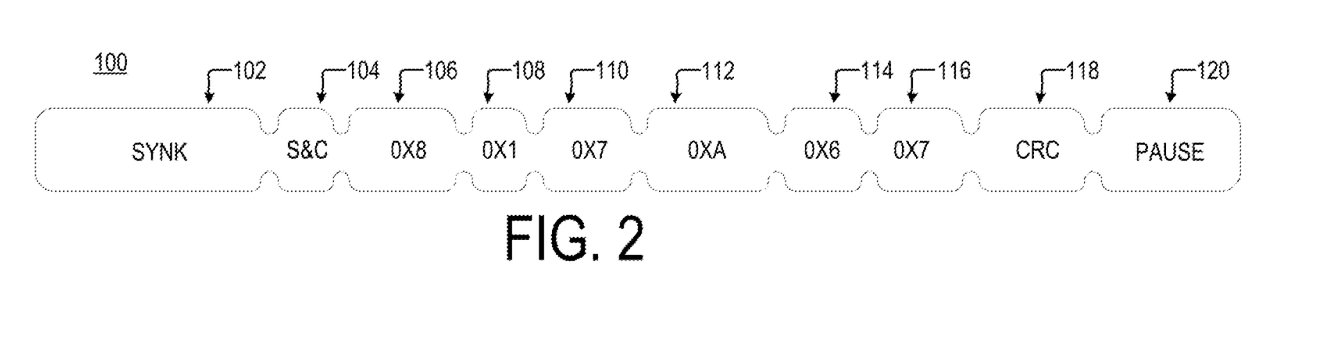
FIG. 2 is a waveform diagram of a message, according to the prior art.

FIG. 2 is a schematic diagram of message 100, according to the prior art. In the example of FIG. 2, symbol 1 has a value of 0x8', symbol 2, has a value of '0x1', symbol 3 has a value of '0x7', symbol 4 has a value of '0xA', symbol 5 has a value of '0x6', and symbol 6 has a value of '0x7'. FIG. 2 is provided to illustrate that the duration of each pulse (or nibble) that is used to encode one of symbols 1-6 may be proportional to the value of the encoded symbol, such that a pulse (or nibble) that encodes a small value would have shorter duration than a pulse (or nibble) that encodes a large value.

Figure 3:
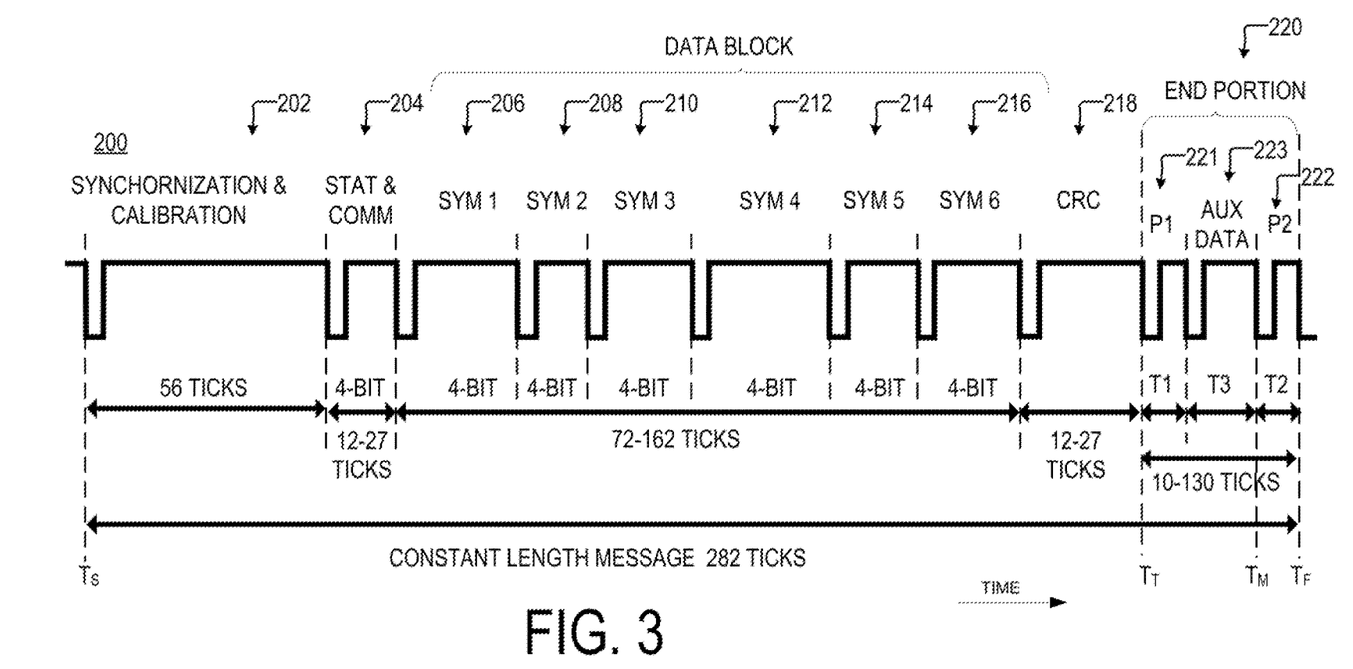
FIG. 3 is a waveform diagram of an example of a message, according to aspects of the disclosure.

FIG. 3 is a diagram of a message 200, according to aspects of the disclosure. Message 200 is nearly identical to message 100. However, unlike message 100, message 200 is adapted to encode auxiliary data in what would otherwise have been the pause pulse of message 200. Message 200 may have the same transmission duration as message 100. However, message 200 is advantageous over message 100 in that it can carry a larger payload than message 100, thus enabling a data stream consisting of messages, such as message 200, to have a larger data throughput than an equivalent data stream that is constituted of messages, such as message 100.

As illustrated, message 200 may include a synchronization and calibration pulse 202, a status and communications nibble 204, data nibbles 206-216, a Cyclic Redundancy Check (CRC) nibble 218, and an end portion 220.

Synchronization and calibration pulse 202 flags the start of message 200 and it serves as a benchmark for analysis of the signal that encodes message 200. Synchronization and calibration pulse 202 is equal to 56 ticks, where a tick is a unit of time used to measure the duration of various pulses that are part of message 200. A tick could have any suitable duration, such as 3 microseconds, 3.54 microseconds, or 4 microseconds, for example. In this regard, the synchronization and calibration pulse 202 may be used to determine the exact length (in seconds) of a tick, which is used afterwards in decoding the signal that represents message 200. According to the present example, message 200 has a fixed duration of 1000 microseconds (or 282 ticks), and each tick is equal to 3.54 microseconds.

Status and communications nibble 204 may encode diagnostic information along with additional data. For example, status and communications nibble 204 may be used to communicate device ID information, and or any other type of information.

Nibbles 206-216 form what is herein referred to as the "data block" of message 200. Each of the nibbles 206-216 may encode up to 4 bits of data. Specifically, each of the nibbles 206-216 may encode a different respective symbol having a value in the range 0x0-0xF. According to the example, nibble 206 may encode a first symbol (hereinafter "symbol 1"), nibble 208 may encode a second symbol (hereinafter "symbol 2"), nibble 210 may encode a third symbol (hereinafter "symbol 3"), nibble 212 may encode a fourth symbol (hereinafter "symbol 4"), nibble 214 may encode a fifth symbol (hereinafter "symbol 5"), and nibble 216 may encode a sixth symbol (hereinafter "symbol 6").

According to the present example, each of the symbols is encoded by using pulse-width modulation (PWM), such that the value of the symbol is represented by the duration of the pulse (or nibble) that encodes it. For example, a pulse (or nibble) that is 12 ticks wide may encode the value of '0x0', a pulse (or nibble) that is 13 ticks wide may encode the value of '0x1', a pulse (or nibble) that is 14 ticks wide may encode the value of '0x2', a pulse (or nibble) that is 15 ticks wide may encode the value of '0x3', and so on, up to a pulse (or nibble) that is 27 ticks wide for the value of '0xF'. As a result of this arrangement, the duration of each pulse (or nibble) would be proportional to the value that is encoded by that pulse (or nibble). For example, a nibble that encodes the value of 0x1 would have a shorter duration than another nibble that encodes the value of 0xC. As used throughout the disclosure, the phrases "nibble" and "pulse" are used interchangeably. Furthermore, as used throughout the disclosure, the phrases "width of a pulse (or nibble)" and "duration of a pulse (or nibble)" are also used interchangeably.

CRC nibble 218 contains a checksum for the data block of message 200. CRC nibble 218 and status and communications nibble 204 may also use PWM to encode data.

End portion 220 may synchronize the transmission of message 200 to a fixed period of time. The duration of end portion 220 may be selected so that the total transmission time of the message adds up to exactly 1000 microseconds. Thus, the shorter the total duration of nibbles 204-218, the longer the duration of end portion 220. By contrast, the longer the total duration of nibbles 204-218, the shorter the duration of the end portion 220. In the example of FIG. 3, end portion 220 may have a duration in the range of 10-130 ticks, synchronization and calibration pulse 202 may have a duration equal to 56 ticks, and each of nibbles 204-218 may have a duration in the range of 12-27 ticks.

End portion 220 may include a first pause sub-period 221, a second pause sub-period 222, and a data nibble 223. Data nibble 223 may be transmitted between pause sub-periods 221 and 222. Data nibble 223 may encode what is herein referred to as "auxiliary" data. The auxiliary data may be part of the same channel as the data in the data block of message 200 or, alternatively, the auxiliary data and the data block of message 200 may be part of different data channels. In some implementations, the minimum duration of data nibble 223 may be different from the minimum duration of any of nibbles 206-216. Alternatively, in some implementations, the minimum duration of data nibble 223 may be the same as the minimum duration of nibbles 206-216. Additionally or alternatively, in some implementations, the maximum duration of data nibble 223 may be different from the maximum duration of any of nibbles 206-216. Additionally or alternatively, in some implementations, the maximum duration of data nibble 223 may be the same as the maximum duration of nibbles 206-216. As noted above, each of nibbles 206-216 may encode 4 bits of data. Data nibble 223, on the other hand, may be used to encode fewer bits of data or a larger number of bits. Alternatively, in some implementations, data nibble 223 may also encode 4 bits of data, and it may be subject to the same specification as nibbles 206-216. As used herein, the phrase "data nibble encodes X bits of data" means that the data nibble may have a maximum duration that permits the encoding of X bits of data when the data is encoded by using PWM encoding.

In the example of FIG. 3, end portion 220 includes a single data nibble 223. However, alternative implementations are possible in which end portions 220 includes multiple data nibbles 223. In such implementations, the nibbles 223 may be transmitted after the first pause sub-period 221 and before the second sub-period 222. As noted above, in some implementations, nibbles 223 may be formatted in the same or similar way to nibbles 206-216.

Figure 4:
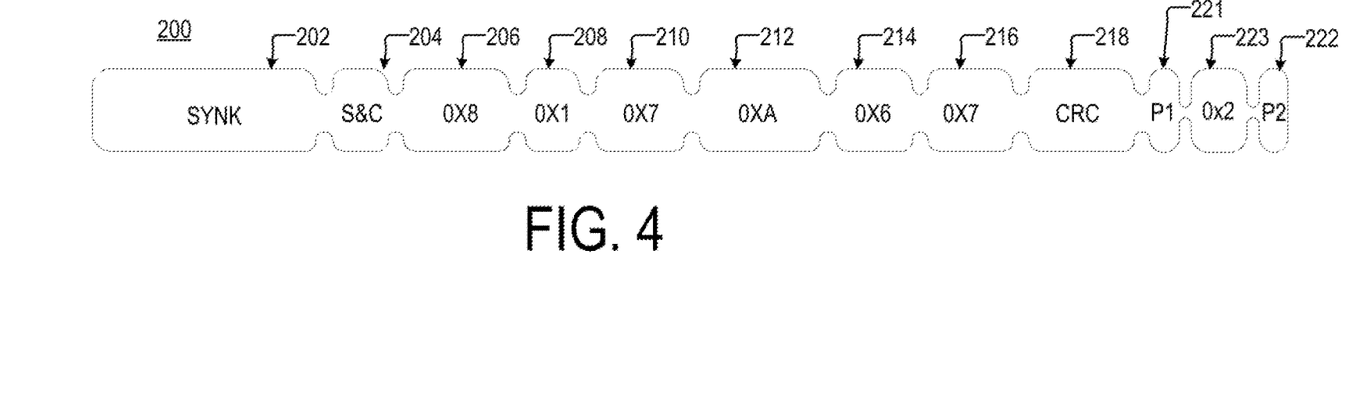
FIG. 4 is a waveform diagram of an example of a message, according to aspects of the disclosure.

FIG. 4 is a schematic diagram of message 200, according to aspects of the disclosure. In the example of FIG. 4, symbol 1 has a value of '0x8', symbol 2, has a value of '0x1', symbol 3 has a value of '0x7', symbol 4 has a value of '0xA', symbol 5 has a value of '0x6', and symbol 6 has a value of '0x7'. Furthermore, in the example of FIG. 4, data nibble 223 is used to encode the value of '0x2'. FIG. 4 is provided to illustrate that the duration of each pulse (or nibble) that is used to encode one of symbols 1-6, as well as data nibble 223, may be proportional to the value of the encoded symbol, such that a pulse (or nibble) that encodes a small value would have shorter duration than a pulse (or nibble) that encodes a larger value.

Figure 5:
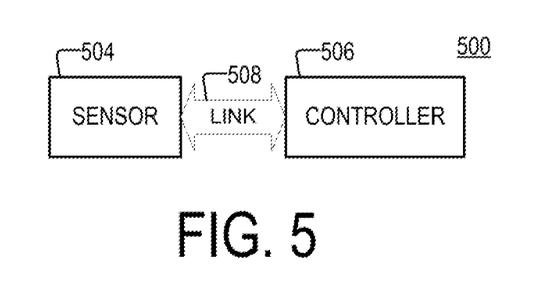
FIG. 5 is a diagram of an example of a system, according to aspects of the disclosure.

FIG. 5 is a schematic diagram of a system 500. As illustrated, system 500 may include a sensor 504 that is coupled to controller 506 via a link 508. In operation, sensor 504 may generate a data stream and transmit the data stream to controller 506. The data stream may include a plurality of messages. Each of the plurality of messages may be formatted as discussed above with respect to message 200. Additionally or alternatively, in some implementations, each of the plurality of messages may be transmitted in accordance with a process 800, which is discussed further below with respect to FIG. 8.

Figure 6:
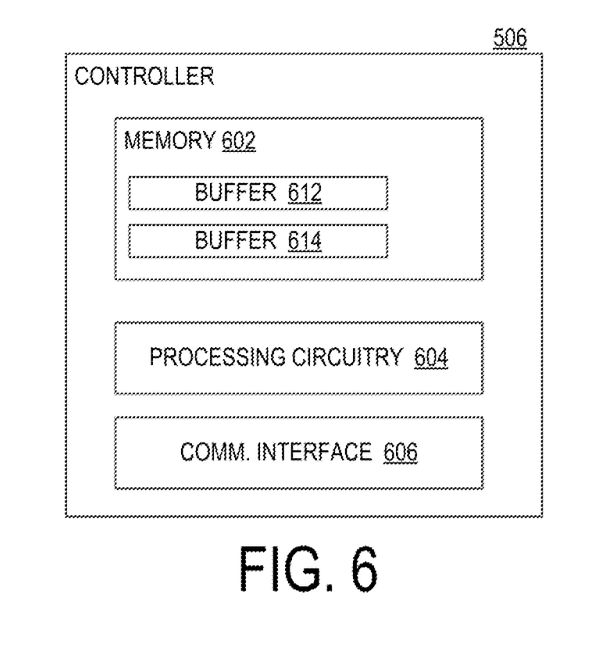
FIG. 6 is a diagram of an example of a controller, according to aspects of the disclosure.

FIG. 6 is a diagram of an example of controller 506, according to aspects of the disclosure. As illustrated, controller 506 may include a memory 602, a processing circuitry 604, and a communications interface 606. The memory 602 may include any suitable type of volatile or non-volatile memory. For example, the memory 602 may include a solid-state drive (SSD), a hard disk (HD), a random-access memory (RAM), Synchronous Dynamic Random-Access Memory (SDRAM), etc. The processing circuitry 604 may include any suitable type of processing circuitry, such as one or more general-purpose processors (e.g., an x86 processor, a MIPS processor, an ARM processor, etc.), special-purpose processors, application-specific integrated circuits (ASICs), field-programmable gate arrays (FPGAs), etc. Communications interface 606 may include any suitable type of communications interface, such as one or more serial communications interfaces, parallel communications interfaces, Ethernet adapters, or wireless data interfaces, etc. In the present example, communications interface 606 may include a serial communications interface for receiving messages, such as message 200, which is discussed above with respect to FIG. 3. Memory 602 may include buffers 612 and 614. In operation, controller 506 may store data, which is part of the data blocks of received messages, in buffer 612. Furthermore, controller 506 may store, in buffer 614, auxiliary data that is part of the received messages. Although, in this example, the data blocks and auxiliary data of received messages are stored in different buffers, alternative implementations are possible in which the data blocks and auxiliary data are stored in the same buffer.

Figure 7:
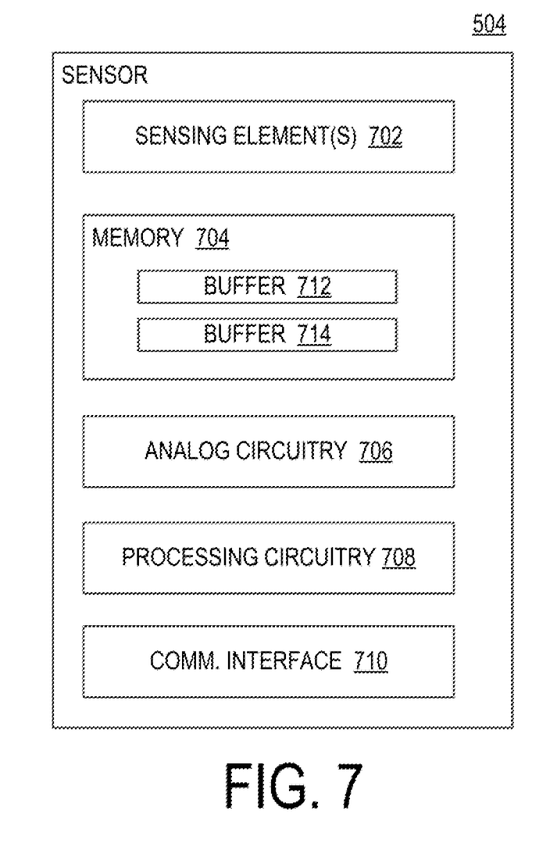
FIG. 7 is a diagram of an example of a sensor, according to aspects of the disclosure.

FIG. 7 is a schematic diagram of sensor 504, according to aspects of the disclosure. As illustrated, sensor 504 may include one or more sensing elements 702, a memory 704, analog circuitry 706, processing circuitry 708, and a communications interface 710. The one or more sensing elements 702 may include at least one of a magnetic field sensing element, an optical sensing element, a pressure sensing element, a chemical sensing element, or any other suitable type of sensing element. The memory 704 may include any suitable type of volatile and/or non-volatile memory, such as a flash memory or a dynamic random-access memory (DRAM), for example. The analog circuitry 706 may include one or more amplifiers, analog-to-digital converters, digital-to-analog converters, or any other suitable type of analog circuitry typically found in a sensor. The processing circuitry 708 may include one or more application-specific processors, general-purpose processors, field-programmable gate arrays (FPGAs), or any other suitable type of processor. The communications interface 710 may include any suitable type of parallel or serial communications interface. In the present example, interface 710 may include a serial communications interface for transmitting messages, such as message 200, which is discussed above with respect to FIG. 3. Memory 704 may include buffers 712 and 714. In operation, sensor 504 may transmit the data stored in buffers 712 and 714 in messages that are formatted in the same way as message 200 (shown in FIG. 3). In some implementations, sensor 504 may encode data stored in buffer 712 into the data blocks of transmitted messages while encoding data stored in buffer 714 into the end portions of transmitted messages. Although, in the present example, sensor 504 uses two different buffers to draw data from, alternative implementations are possible in which the data in the end portion 220 of any message 200 (i.e., the auxiliary data of the message) and the data that is part of the data block of the message (i.e., the data encoded by nibbles 206-216) are drawn from the same buffer. The term "buffer" as used throughout the disclosure may refer to a set of one or more memory locations. The memory locations may or may not be contiguous.

Figure 8:
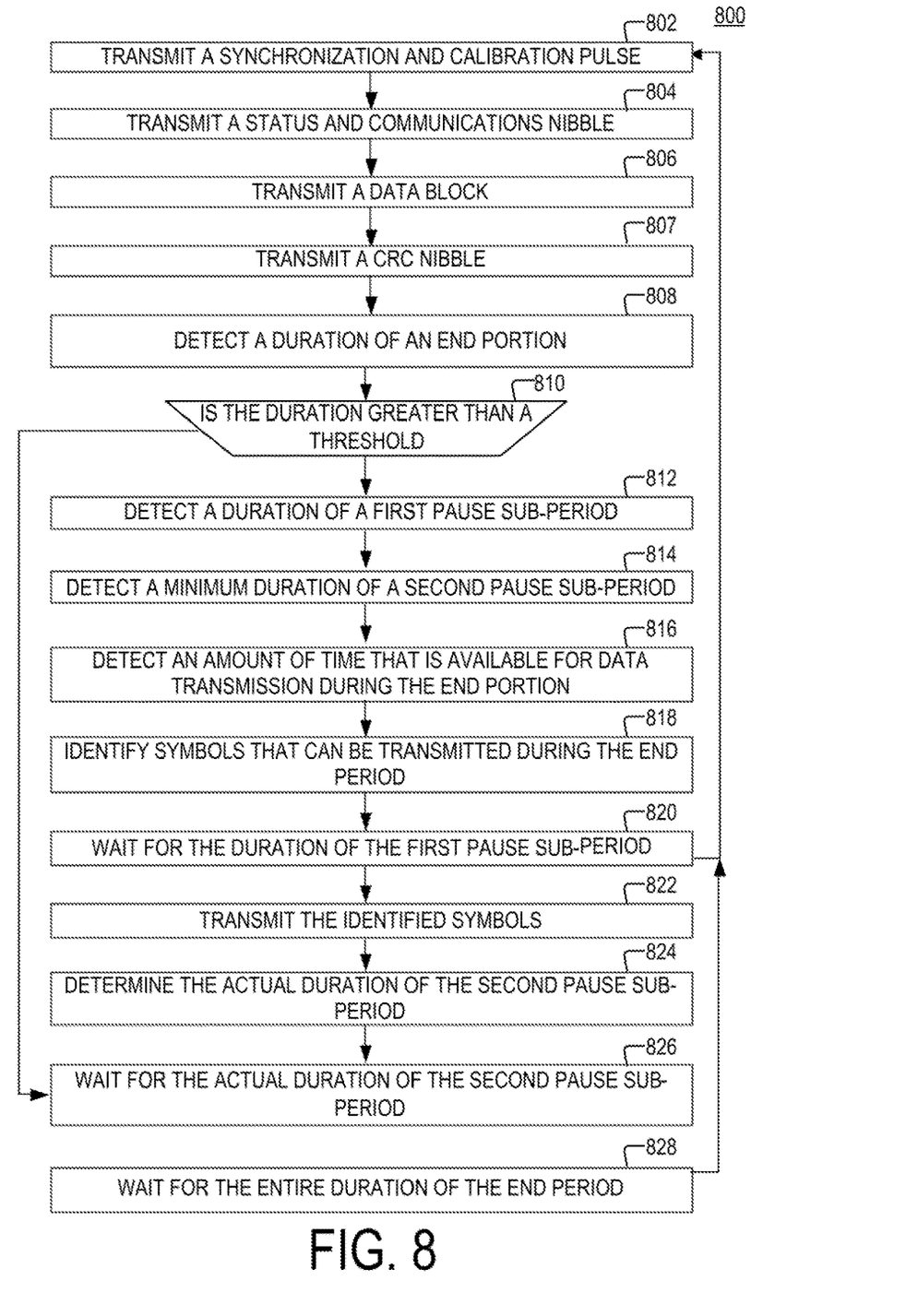
FIG. 8 is a flowchart of an example of a process, according to aspects of the disclosure.

FIG. 8 is a flowchart of an example of a process 800 for transmitting message 200 (shown in FIG. 3), according to aspects of the disclosure. In the example of FIG. 8, process 800 is performed by sensor 504 (shown in FIG. 7). However, the present disclosure is not limited to any specific entity performing process 800. According to the example of FIG. 8, message 200 is transmitted to controller 506 (shown in FIG. 6). However, the present disclosure is not limited to any specific recipient for message 200.

At step 802, sensor 504 transmits, to controller 506, the synchronization and calibration pulse 202 of message 200. At step 804, sensor 504 transmits, to controller 506, the status and communications nibble 204 of message 200. At step 806, sensor 504 transmits, to controller 506, the data block of message 200. The data block may include a plurality of symbols retrieved from buffer 712 (shown in FIG. 7). As noted above, the data block of message 200 may include nibbles 206-216, wherein each of nibbles 206-216 uses PWM to encode a different one of the plurality of symbols. At step 807, sensor 504 transmits, to controller 506, the CRC nibble 218 of message 200. As noted above, CRC nibble 218 may encode a checksum for the data block (transmitted at step 806).

At step 808, sensor 504 determines the duration of the end portion 220 of message 200. In the example of FIG. 3, end portion 220 starts at time $T_T$ and ends at time $T_F$. Furthermore, in the example of FIG. 3, the duration of message 200 is the period starting at time $T_S$ and ending at time $T_F$. And still furthermore, in the example of FIG. 3, the time taken to transmit the synchronization and calibration pulse 202 and nibbles 204-218 of message 200 is the period starting at time $T_S$ and ending at time $T_T$. As can be readily appreciated, the duration of the end portion 220 can be determined by subtracting the duration of period $T_S$-$T_T$ from the duration of period $T_S$-$T_F$. As discussed above, the period $T_S$-$T_F$ has a fixed duration (e.g., 1000 ms or 282 ticks), which may be established in the configuration settings of sensor 504 or elsewhere. On the other hand, the duration of period $T_S$-$T_T$ would vary depending on the values of the symbols that are being encoded into message 200 (because PWM is used to encode the symbols).

At step 810, sensor 504 determines whether the duration of end portion 220 (determined at step 808) is greater than a threshold. If the duration of end portion 220 is greater than the threshold, process 800 proceeds to step 812. Otherwise, process 800 proceeds to step 826. In the example of FIG. 8, step 810 is performed to account for the possibility of end portion 220 being too short to accommodate any auxiliary data.

At step 812, sensor 504 determines the duration T1 (shown in FIG. 3) of the first pause sub-period 221 of message 200. In some implementations, determining the duration of the first pause sub-period 221 may include retrieving, from memory 704, the value of a configuration setting that specifies the duration of the first pause sub-period 221.

At step 814, sensor 504 determines a minimum duration for the second pause sub-period 222 of message 200. In some implementations, determining the minimum duration of the second pause sub-period 222 may include retrieving, from memory 704, the value of a configuration setting that specifies the minimum duration of the second pause sub-period 222.

At step 816, sensor 504 determines the total amount of time that is available for the transmission of symbols in the end portion 220. The total amount of time may be determined by subtracting from the duration of end portion 220 (determined at step 808) the duration T1 of the first pause sub-period 221 (determined at step 812) and the minimum duration of the second pause sub-period 222 (determined at step 814).

At step 818, sensor 504 identifies one or more symbols for transmission during end portion 220. As noted above, when PWM encoding is used, the time taken to transmit each symbol may vary depending on the value of the symbol. Thus, to identify one or more symbols for transmission, sensor 504 may identify a plurality of symbols that are stored in buffer 714 (or buffer 712). Next, sensor 504 may determine the respective time it would take to transmit each of the plurality of symbols. And finally, sensor 504 may select a subset of the plurality of symbols whose total transmission time is less than the available time (determined at step 816). In some implementations, step 818 may be performed in accordance with a process 900, which is discussed further below with respect to FIG. 9.

At step 820, sensor 504 waits for the duration of the first pause subperiod. In some implementations, at step 820, sensor 504 may transmit, to controller 506, a pause pulse having the duration T1, which is determined at step 812.

At step 822, sensor 504 transmits, to controller 506, the symbols that are identified at step 818. In some implementations, each of the identified symbols may be transmitted by using a different respective data nibble 223.

At step 824, sensor 504 determines the actual duration T3 (shown in FIG. 3) of the second pause sub-period 222. The actual duration may be equal to a difference between the entire duration of message 200 and the time taken to transmit the entire contents of message 200, at steps 802, 804, 806, and 808. Specifically, the actual duration of the second pause sub-period 222 may be equal to the difference between the duration of period $T_S$-$T_F$ (shown in FIG. 3) and the duration of period $T_S$-$T_M$ (also shown in FIG. 3). In one respect, the actual duration T3 of the second pause sub-period 222 may differ from the minimum duration because the symbols (identified at step 818) may take a shorter time to transmit than the total time available for transmitting those symbols (i.e., the time determined at step 816).

At step 826, sensor 504 waits for the actual duration of the second pause sub-period 222. In some implementations, at step 826, sensor 504 may transmit, to controller 506, a pause pulse having the duration T3, which is determined at step

824. After step 826 is completed, process 800 returns to step 802, at which point the transmission of another message 200 would begin.

At step 828, sensor 504 waits for the duration of the entire end portion 220. In some implementations, at step 826, sensor 504 may transmit, to controller 506, a pause pulse having the during duration determined at step 812. The pause pulse may last (i.e., remain high) for the entire duration of the period $T_T$-$T_F$ (shown in FIG. 3). After step 828 is completed, process 800 returns to step 802, at which point the transmission of another message 200 would begin. If the flow of process 800 goes through step 828, no auxiliary data is transmitted during end portion 220. On the other hand, if the flow of process 800 goes through steps 812-826, auxiliary data is embedded in the end portion 220 of message 200, in addition to data that is encoded by nibbles 206-216 of message 200.

Process 800 is provided as an example only. At least some of the steps in process 800 may be performed in parallel, in a different order, or altogether omitted. For example, the time available for transmitting data in the end portion 220 of message 200 may be determined before the data block of message 200 is transmitted or before any other part of message 200 is transmitted. As used herein, determining the amount of time that is available for transmitting data during end portion 220 may include at least one of determining the number of ticks that are available for transmitting the data or determining the number of microseconds (or seconds, etc.) that are available for transmission.

In the example of FIGS. 3-8, the duration of message 200 is 282 ticks. However, alternative implementations are possible in which the duration of message 200 is extended (e.g., up to 920 tics, etc.). In such implementations, the minimum duration of end portion 220 may be much larger than when message 200 is limited to a duration of 282 ticks, which could in turn guarantee that at least some amount of auxiliary data would be able to fit within the end portion 220 of each and every message 200. In such implementations, steps 810 and 816 can be omitted, and a fixed amount of auxiliary data, which is guaranteed to fit in even the shortest end portion 220, can be transmitted during each end portion 220.

In some implementations, sensor 504 may include a magnetic field sensor (e.g., a speed sensor, a position sensor, a current sensor, etc.), an optical sensor, a pressure sensor, a temperature sensor, and/or any other suitable type of sensor. The term "auxiliary" as used in the phrase "auxiliary data" is intended to differentiate between data encoded by nibbles 206-216 and data encoded by one or more data nibbles 223 of message 200. The term "auxiliary" is not intended to imply any other distinction between data encoded by data nibbles 223 and the data encoded by nibbles 206-216. In some implementations, both the data block and the auxiliary data of message 200 may be part of the same sensor reading, in which case the sensor reading would need to be reconstituted (by controller 506) from both the data block and the auxiliary data. In other implementations, the data block of message 200 may contain a sensor reading, whereas the auxiliary data of message 200 may constitute an error code or other sensor information. In this case, the data block may be part of a first channel that is dedicated to the transmission of sensor readings and the auxiliary data may be part of a second channel that is dedicated to the transmission of error codes and status information.

In some implementations, the auxiliary data that is transmitted as part of end portion 220 of message 200 may include at least one of a motor information message, an indication of the speed of a motor or target, an error code, or a switch control message. As another example, the data block of message 200 may include fast message information and the auxiliary data of message 200 may include slow message information. The slow message information may be any information that is transmitted in conventional messages that are known in the art. As yet another example, the data block of message 200 may include instantaneous system feedback information and the auxiliary data of message 200 may include operation mode information. The operation mode information may include information that is transmitted in conventional messages that are known in the art. Stated succinctly, the present disclosure is not limited to any specific type of information being encoded in message 200.

As noted, above message 200 may have a fixed duration (e.g., 1000 microseconds). This means that, in a data stream consisting of messages 200 (i.e., different instances of message 200), the duration of period $T_S$-$T_F$ (shown in FIG. 3) of each message 200 would be the same (i.e., 1000 microseconds) even though the duration of period $T_S$-$T_T$ of each message 200 would vary, depending on the data that is encoded in that message 200. It will be recalled that the duration of period $T_S$-$T_T$ is the time it takes to transmit elements of the message 200 that precede the end-period of the message 200. (E.g., see FIG. 3.) Under the nomenclature of the present disclosure, each symbol that is encoded by one of nibbles 206-216 of message 200 is referred to as a block data symbol, and each symbol that is encoded by a respective nibble 223 of message 200 is referred to as an auxiliary data symbol. Under the nomenclature of the present disclosure, the duration of period $T_S$-$T_F$ of any message 200 (shown in FIG. 3) is also referred to as "time allotted for transmitting the message 200". Under the nomenclature of the present disclosure, the synchronization pulse 202 and nibbles 204-218 are considered elements of message 200 that precede end portion 220 of message 200 (because they are transmitted before the end portion begins).

In the example of FIGS. 3-8, data nibble(s) 223 are transmitted following the passage of the first pause subperiod 221. However alternative implementations are possible in which the transmission of data nibble(s) 223 begins immediately following the transmission of CRC nibble 218.

In one example, message 100 may be a conventional Single Edge Nibble Transmission (SENT) protocol message, and process 800 may be used to extend the SENT protocol to enable a larger data throughput. However, it will be understood that the concepts and ideas presented throughout the disclosure are not limited to the SENT protocol. The concepts and ideas presented throughout the disclosure can be used in any protocol that features an end-portion of variable length that is used to synchronize the protocol's messages to a fixed (or same) duration.

Figure 9:
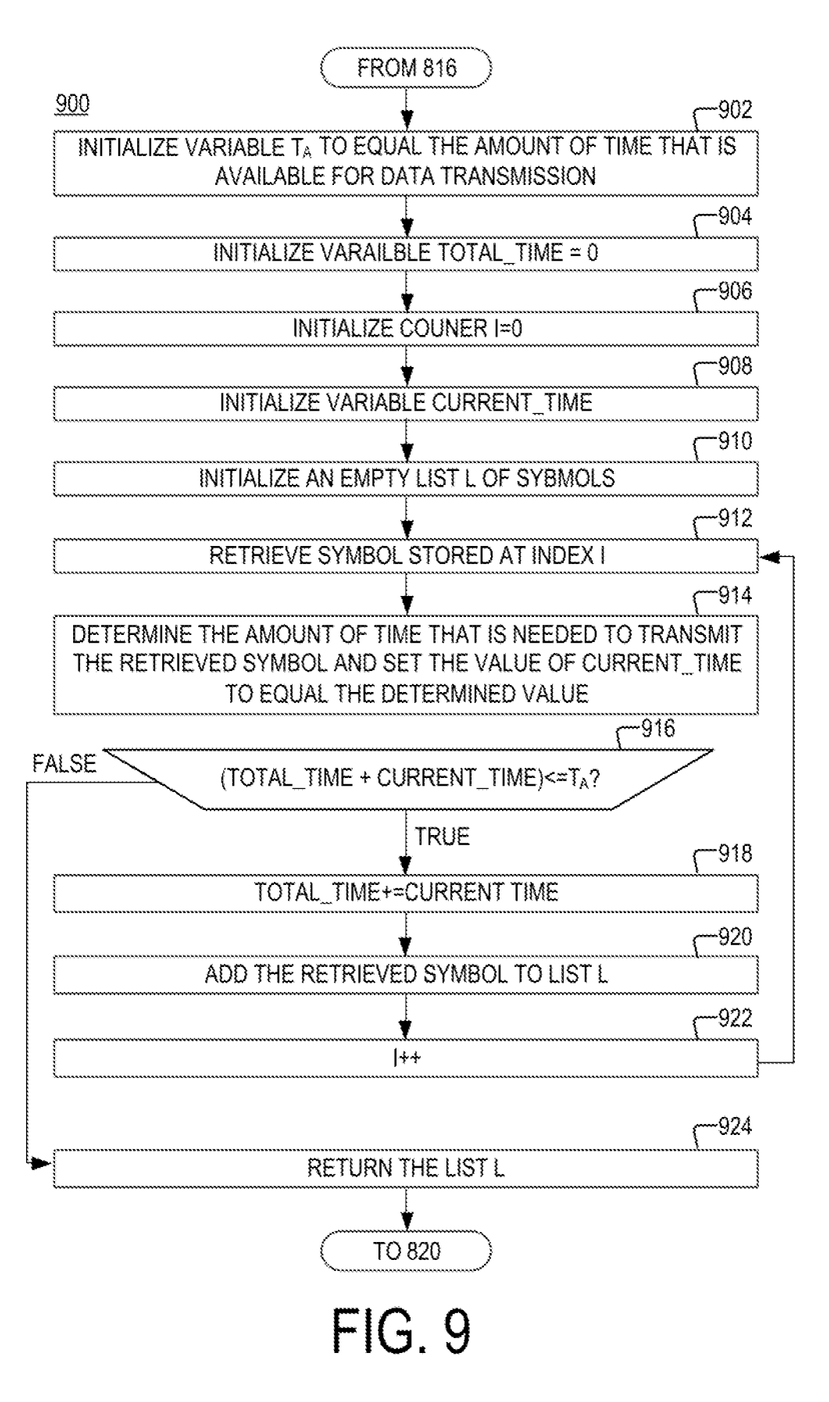
FIG. 9 is a flowchart of an example of a process, according to aspects of the disclosure.

FIG. 9 is a flowchart of an example of a process 900 for identifying one or more symbols for transmission during end portion 220, as specified by step 818 of process 800. At step 902, sensor 504 initializes a variable TA and sets it to equal the amount of time that is available for data transmission during end portion 220 (determined at step 816). At step 904, sensor 504 initializes a variable TOTAL_TIME and sets its value to 0. At step 906, sensor 504 initializes a counter I and sets its value to 0. At step 908, sensor 504 initializes a variable CURRENT_TIME. At step 910, sensor 504 initializes an empty list L. At step 912, sensor 504 retrieves, e.g., from buffer 714, a symbol that is stored at index I. At step 914, sensor 504 determines the amount of time that is necessary to transmit the retrieved symbol and sets the value of CURRENT_TIME to equal the value of the determined amount of time. Determining the amount of time that is necessary to transmit the retrieved symbol may include determining the pulse width that encodes the symbol. At step 916, sensor 504 evaluates the expression (TOTAL_TIME+ CURRENT_TIME)<=TA. If the expression evaluates to TRUE, process 900 proceeds to step 918. Otherwise, process 900 proceeds to step 924. At step 918, sensor 504 increments the value of TOTAL_TIME by the value of CURRENT_TIME. At step 920, sensor 504 adds the symbol (retrieved at step 914) to the list L. At step 922, sensor 504 increments the value of counter I by one. At step 924, sensor 504 returns the list L. In the example of FIG. 9, the list L includes the symbols that were selected for transmission during end portion 220 and TOTAL_TIME represents the total amount of time that is necessary to transmit all symbols that are currently part of the list L. It will be understood that FIG. 9 is provided to illustrate the idea that, in some implementations, sensor 504 may sequentially retrieve symbols for transmission until it is determined that no more symbols can be transmitted in the available time.

Figure 10:
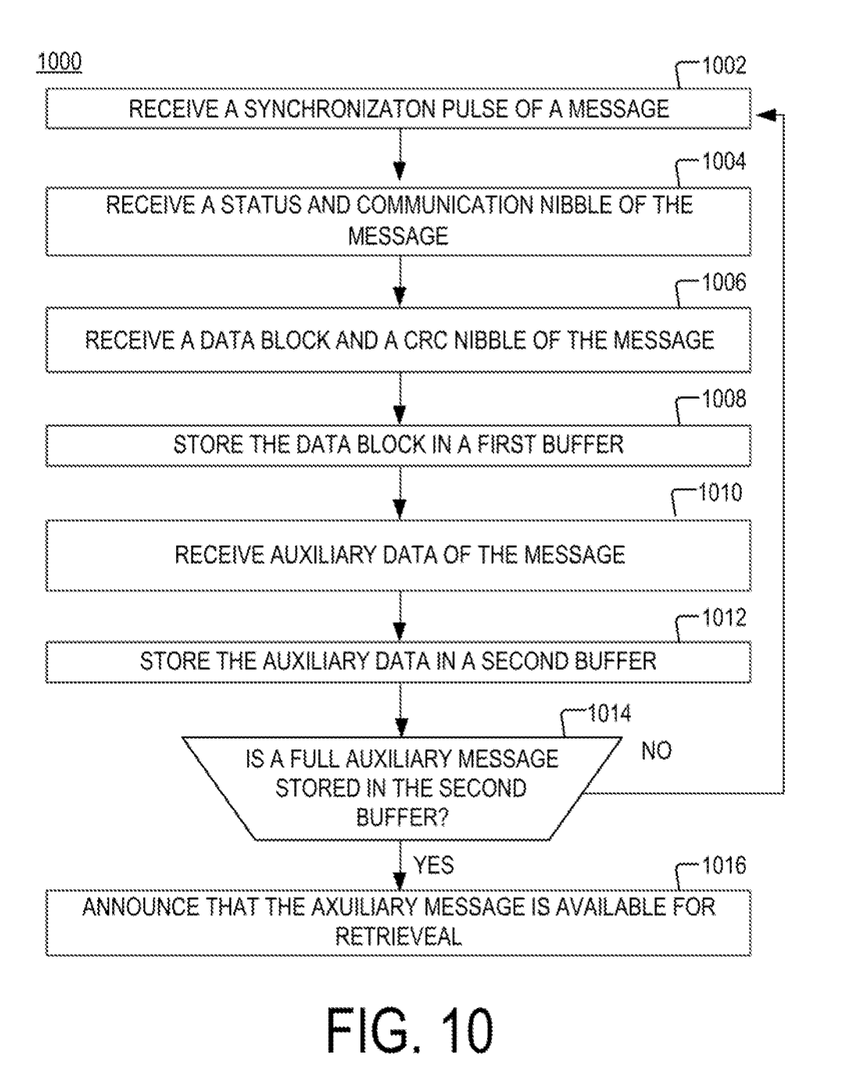
FIG. 10 is a flowchart of an example of a process, according to aspects of the disclosure.

FIG. 10 is a diagram of an example of a process 1000 for receiving one or more messages, such as message 200 that is transmitted in process 800. According to the present example, process 1000 is performed by controller 506. However, the present disclosure is not limited to any specific entity performing process 1000. At step 1002, controller 506 receives the synchronization and calibration pulse 202 of message 200 (transmitted at step 802). At step 1004, controller 506 receives the status and communications nibble 204 of message 200 (transmitted at step 804). At step 1006, controller 506 receives the data block of message 200 (transmitted at step 806) and the CRC nibble 218 of message 200 (transmitted at step 807). At step 1008, controller 506 stores the symbols that are part of the data block in buffer 612. At step 1010, controller 506 receives the auxiliary data that is transmitted in the end portion 220 of message 200 (at step 822). At step 1012, controller 506 stores the auxiliary data in buffer 614. At step 1014, controller 506 determines whether a complete auxiliary message is stored in buffer 614. If a complete message is stored in buffer 614, process 1000 proceeds to step 1016. Otherwise, process 1000 returns to step 1002. At step 1016, controller 506 announces that a complete auxiliary message is available for retrieval in buffer 614.

In some implementations, the phrase "announce that a complete auxiliary message is available for retrieval" may refer to any action that would cause the contents of buffer 614 to be retrieved and/or processed by logic that is situated outside of the protocol stack layer(s) that execute process 1000. By way of example, controller 506 may announce the availability of the auxiliary message by generating an interrupt, which would subsequently trigger the retrieval of the message from buffer 614. As another example, controller 506 may announce the availability of the auxiliary message by storing the auxiliary message in a predetermined register. As another example, controller 506 may announce the availability of the auxiliary message by executing a particular function or logic for processing the contents of buffer 614.

In one aspect, FIG. 10 illustrates that different portions of the same packet may be transmitted as auxiliary data in a plurality of different messages 200, and subsequently reconstituted at the receiver. However, the present disclosure is not limited thereto. For example, the auxiliary data (received at step 1010) and the data that is part of the data block (received at step 1012) may be stored in the same buffer and be part of the same object, word, or packet. As another example, the auxiliary data in any message 200 may constitute an entire data item (e.g., object, word or packet), in which case no reconstitution from multiple messages would be necessary at the receiver (e.g., controller 506). In some implementations, the same data item (e.g., word or packet) may be received in the respective data blocks of a plurality of messages 200 and subsequently reconstituted at the receiver. Stated succinctly, the present disclosure is not limited to any specific method for processing data that is received in one or more messages 200.

As used herein, the term processing circuitry of a system may refer to any digital or analog circuitry that is part of a system. For example, the term "processing circuitry" may refer only to a main processing circuitry of the system, such as the processing circuitry 706 of sensor 504 and/or the processing circuitry 604. However, as another example, the term "processing circuitry" may refer to electronic circuitry that is part of the communications interface or another component of the system (e.g., communications interface 710 or communications interface 606, etc.). Additionally or alternatively, in yet another example, the term "processing circuitry" may refer to both the main processing circuitry of the system and circuitry that is part of the communications interface of the system.

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

As used herein, the term "magnetic-field sensor" is used to describe a circuit that uses a magnetic field sensing element, generally in combination with other circuits. Magnetic-field sensors are used in a variety of applications, including, but not limited to, an angle sensor that senses an angle of a direction of a magnetic field, a current sensor that senses a magnetic field generated by a current carried by a current-carrying conductor, a magnetic switch that senses the proximity of a ferromagnetic object, a rotation detector that senses passing ferromagnetic articles, for example, magnetic domains of a ring magnet or a ferromagnetic target (e.g., gear teeth) where the magnetic-field sensor is used in combination with a back-biased or other magnet, and a magnetic-field sensor that senses a magnetic-field density of a magnetic field.

As used herein, the term "magnetic-field sensing element" is used to describe a variety of electronic elements that can sense a magnetic field. The magnetic-field sensing element can be, but is not limited to, a Hall Effect element a magnetoresistance element, a magnetotransistor or an inductive coil. As is known, there are different types of Hall Effect elements, for example, a planar Hall element, a vertical Hall element, and a Circular Vertical Hall (CVH) element.

As is also known, there are different types of magnetoresistance elements, for example, a semiconductor magnetoresistance element such as Indium Antimonide (InSb), a giant magnetoresistance (GMR) element, an anisotropic magnetoresistance element (AMR), a tunneling magnetoresistance (TMR) element, and a magnetic tunnel junction (MTJ).

The magnetic field sensing element may be a single element or, alternatively, may include two or more magnetic field sensing elements arranged in various configurations, e.g., a half bridge or full (Wheatstone) bridge. Depending on the device type and other application requirements, the magnetic field sensing element may be a device made of a type IV semiconductor material such as Silicon (Si) or Germanium (Ge), or a type III-V semiconductor material like Gallium-Arsenide (GaAs) or an Indium compound, e.g., Indium-Antimonide (InSb).

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

To the extent directional terms are used in the specification and claims (e.g., upper, lower, parallel, perpendicular, etc.), these terms are merely intended to assist in describing and claiming the invention and are not intended to limit the claims in any way. Such terms, do not require exactness (e.g., exact perpendicularity or exact parallelism, etc.), but instead it is intended that normal tolerances and ranges apply. Similarly, unless explicitly stated otherwise, each numerical value and range should be interpreted as being approximate as if the word "about", "substantially" or "approximately" preceded the value of the value or range.

Moreover, the terms "system," "component," "module," "interface," "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

While the exemplary embodiments have been described with respect to processes of circuits, including possible implementation as a single integrated circuit, a multi-chip module, a single card, or a multi-card circuit pack, the described embodiments are not so limited. As would be apparent to one skilled in the art, various functions of circuit elements may also be implemented as processing blocks in a software program. Such software may be employed in, for example, a digital signal processor, micro-controller, or general-purpose computer.

Some embodiments might be implemented in the form of methods and apparatuses for practicing those methods. Described embodiments might also be implemented in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the claimed invention. Described embodiments might also be implemented in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the claimed invention. When implemented on a general-purpose processor, the program code segments combine with the processor to provide a unique device that operates analogously to specific logic circuits. Described embodiments might also be implemented in the form of a bitstream or other sequence of signal values electrically or optically transmitted through a medium, stored magnetic-field variations in a magnetic recording medium, etc., generated using a method and/or an apparatus of the claimed invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments.

Also, for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

It will be further understood that various changes in the details, materials, and arrangements of the parts which have been described and illustrated in order to explain the nature of the claimed invention might be made by those skilled in the art without departing from the scope of the following claims.

The invention claimed is:

1. A method comprising:
    transmitting a data block that is part of a message, the data block including a plurality of data block symbols;
    detecting a duration of an end portion of the message, the duration being detected based on a difference between:
        (i) a time that is allotted for transmitting the message and (ii) a time needed for transmitting the data block as well as any other element of the message that precedes the end portion; and
    transmitting one or more auxiliary data symbols as part of the end portion of the message,
    wherein the end portion has a flexible duration that is selected to synchronize a total duration of the message to the time that is allotted for transmitting the message, and
    wherein each of the data block symbols and each of the auxiliary data symbols is encoded by using pulse-width modulation (PWM).

2. The method of claim 1, further comprising detecting whether the duration of the end portion exceeds a threshold, wherein the one or more auxiliary data symbols are transmitted only if the duration of the end portion exceeds the threshold.

3. The method of claim 1, further comprising transmitting a pause pulse after transmitting the data block and before transmitting the one or more auxiliary data symbols, the pause pulse being part of the end portion of the message.

4. The method of claim 1, wherein transmitting the one or more auxiliary data symbols includes identifying an amount of time that is available for a transmission of auxiliary data symbols in the end portion of the message and transmitting as many auxiliary data items as part of the end portion of the message as permitted by the amount of time that is available.

5. The method of claim 4, further comprising transmitting a pause pulse after the transmission of the data block and before the transmission of the one or more auxiliary data symbols, wherein the pause pulse is part of the end portion of the message and the amount of time that is available for the transmission of auxiliary data symbols is identified, at least in part, by subtracting a duration of the pause pulse from the duration of the end portion of the message.

6. The method of claim 1, wherein the plurality of data block symbols is retrieved for transmission from a first buffer and the one or more auxiliary data symbols are retrieved for transmission from a second buffer.

7. The method of claim 1, wherein the duration of the end portion of the message is determined prior to transmitting the data block.

8. The method of claim 1, wherein the message that is formatted in accordance with the Single Edge Nibble Transmission (SENT) protocol, but for including auxiliary data symbols in the end portion of the message.

9. The method of claim 1 further comprising, transmitting a first pause pulse before transmitting the one or more auxiliary data symbols and transmitting second pause pulse after transmitting the one or more auxiliary data symbols, the first pause pulse, the second pause pulse, and the one or more auxiliary data symbols being part of the end portion of the message.

10. A system comprising:
a memory; and
a processing circuitry that is operatively coupled to the memory, the processing circuitry being configured to:
transmit a data block that is part of a message, the data block including a plurality of data block symbols;
detect a duration of an end portion of the message, the duration being detected based on a difference between:
(i) a time that is allotted for transmitting the message and (ii) a time needed for transmitting the data block as well as any other element of the message that precedes the end portion; and
transmit one or more auxiliary data symbols as part of the end portion of the message,
wherein the end portion has a flexible duration that is selected to synchronize a total duration of the message to the time that is allotted for transmitting the message, and
wherein each of the data block symbols and each of the auxiliary data symbols is encoded by using pulse-width modulation (PWM).

11. The system of claim 10, wherein the processing circuitry is configured to detect whether the duration of the end portion exceeds a threshold, wherein the one or more auxiliary data symbols are transmitted only if the duration of the end portion exceeds the threshold.

12. The system of claim 10, wherein the processing circuitry is further configured to transmit a pause pulse after transmitting the data block and before transmitting the one or more auxiliary data symbols, the pause pulse being part of the end portion of the message.

13. The system of claim 10, wherein transmitting the one or more auxiliary data symbols includes identifying an amount of time that is available for a transmission of auxiliary data symbols in the end portion of the message and transmitting as many auxiliary data items as part of the end portion of the message as permitted by the amount of time that is available.

14. The system of claim 13, wherein the processing circuitry is further configured to:
transmit a pause pulse after the transmission of the data block and before the transmission of the one or more auxiliary data symbols,
the pause pulse is part of the end portion of the message, and
the amount of time that is available for the transmission of auxiliary data symbols is identified, at least in part, by subtracting a duration of the pause pulse from the duration of the end portion of the message.

15. The system of claim 10, wherein the plurality of data block symbols is retrieved for transmission from a first buffer and the one or more auxiliary data symbols are retrieved for transmission from a second buffer.

16. The system of claim 10, wherein the duration of the end portion of the message is determined prior to transmitting the data block.

17. The system of claim 10, wherein the message that is formatted in accordance with the Single Edge Nibble Transmission (SENT) protocol, but for including auxiliary data symbols in the end portion of the message.

18. The system of claim 10 wherein the processing circuitry is configured to transmit a first pause pulse before transmitting the one or more auxiliary data symbols and transmitting a second pause pulse after transmitting the one or more auxiliary data symbols, the first pause pulse, the second pause pulse, and the one or more auxiliary data symbols being part of the end portion of the message.

19. A non-transitory computer-readable medium storing one or more processor executable instructions, which, when executed by a processing circuitry of a sensor cause the processing circuitry to perform the operations of:
transmitting a data block that is part of a message, the data block including a plurality of data block symbols;
detecting a duration of an end portion of the message, the duration being detected based on a difference between:
(i) a time that is allotted for transmitting the message and (ii) a time needed for transmitting the data block as well as any other element of the message that precedes the end portion; and
transmitting one or more auxiliary data symbols as part of the end portion of the message,
wherein the end portion has a flexible duration that is selected to synchronize a total duration of the message to the time that is allotted for transmitting the message, and
wherein each of the data block symbols and each of the auxiliary data symbols is encoded by using pulse-width modulation (PWM).

20. The non-transitory computer-readable medium of claim 19, wherein the one or more processor instructions, when executed by the processing circuitry, further cause the processing circuitry to perform the operation of transmitting a pause pulse after transmitting the data block and before transmitting the one or more auxiliary data symbols, the pause pulse being part of the end portion of the message.

21. The non-transitory computer-readable medium of claim 19, wherein the one or more processor instructions, when executed by the processing circuitry, further cause the processing circuitry to perform the operations of identifying an amount of time that is available for a transmission of auxiliary data symbols in the end portion of the message and transmitting as many auxiliary data items as part of the end portion of the message as permitted by the amount of time that is available.

22. The non-transitory computer-readable medium of claim 19, wherein:
the one or more processor instructions, when executed by the processing circuitry, further cause the processing circuitry to perform the operation of transmitting a pause pulse after the transmission of the data block and before the transmission of the one or more auxiliary data symbols; and
the pause pulse is part of the end portion of the message and the amount of time that is available for the transmission of auxiliary data symbols is identified, at least in part, by subtracting a duration of the pause pulse from the duration of the end portion of the message.

23. The non-transitory computer-readable medium of claim 19, wherein the one or more processor instructions, when executed by the processing circuitry, further cause the processing circuitry to perform the operations of transmitting a first pause pulse before transmitting the one or more auxiliary data symbols and transmitting second pause pulse after transmitting the one or more auxiliary data symbols, the first pause pulse, the second pause pulse, and the one or more auxiliary data symbols being part of the end portion of the message.

24. A system comprising:
means for transmitting a data block that is part of a message, the data block including a plurality of data block symbols;
means for detecting a duration of an end portion of the message, the duration being detected based on a difference between: (i) a time that is allotted for transmitting the message and (ii) a time needed for transmitting the data block as well as any other element of the message that precedes the end portion; and
means for transmitting one or more auxiliary data symbols as part of the end portion of the message,
wherein the end portion has a flexible duration that is selected to synchronize a total duration of the message to the time that is allotted for transmitting the message, and
wherein each of the data block symbols and each of the auxiliary data symbols is encoded by using pulse-width modulation (PWM).

* * * * *